United States Patent
Yelton et al.

(10) Patent No.: US 7,512,258 B2
(45) Date of Patent: Mar. 31, 2009

(54) SYSTEM AND METHOD FOR PASSIVE WIRE DETECTION

(75) Inventors: Dennis J. Yelton, Albuquerque, NM (US); Robert L. Wright, Albuquerque, NM (US)

(73) Assignee: The Boeing Company, Chicago, IL (US)

( * ) Notice: Subject to any disclaimer, the term of this patent is extended or adjusted under 35 U.S.C. 154(b) by 659 days.

(21) Appl. No.: 11/184,472

(22) Filed: Jul. 19, 2005

(65) Prior Publication Data
US 2007/0019838 A1    Jan. 25, 2007

(51) Int. Cl.
*G06K 9/00* (2006.01)
(52) U.S. Cl. .................... 382/141; 382/173; 340/945
(58) Field of Classification Search .......... 382/141, 382/173, 172, 171, 224, 225, 218, 253, 260, 382/263, 264, 266, 274, 100; 29/857; 701/9, 701/3, 31, 35, 120; 347/245, 238; 439/395, 439/713, 535, 922, 676, 34, 540.1, 408; 326/16, 326/41, 44; 714/30; 340/946, 971, 945, 340/948, 961; 356/5.01; 342/29, 33, 63, 342/2; 343/705, 708
See application file for complete search history.

(56) References Cited

U.S. PATENT DOCUMENTS

| | | | | |
|---|---|---|---|---|
| 4,685,143 A | * | 8/1987 | Choate | 382/170 |
| 4,736,439 A | * | 4/1988 | May | 382/262 |
| 4,742,557 A | * | 5/1988 | Ma | 382/172 |
| 4,970,701 A | * | 11/1990 | Kirkland | 367/131 |
| 5,245,588 A | * | 9/1993 | Kirkland | 367/131 |
| 6,940,994 B2 | * | 9/2005 | Nixon et al. | 382/100 |
| 7,286,912 B2 | * | 10/2007 | Rubin et al. | 701/9 |
| 2002/0153485 A1 | | 10/2002 | Nixon et al. | 250/330 |
| 2007/0088984 A1 | * | 4/2007 | Witt et al. | 714/30 |

OTHER PUBLICATIONS

Non-Final Office Action on co-pending U.S. Appl. No. 11/249,955 dated Sep. 20, 2007.
Notice of Allowance on co-pending U.S. Appl. No. 11/249,955 dated Jun. 11, 2008.
Yamamoto K. et al.; "Analysis of the infrared images to detect power lines"; Dec. 2, 1997; pp. 343-346; Tencon '97 IEEE Region 10 Annual Conference, Speech and Image Technologies for Computing and Telecommunications; XP 010264171; ISBN: 0-7803-4365-4.
Nixon M. D. et al.; "Passive detection of sub-pixel obstacles for flight safety"; vol. 4472, 2001; pp. 1-10; Proceedings of the Spie.
Kasturi, R. et al.; "Wire detection algorithms for navigation"; NASA Research Grant NAG2-1487 for Jul. 1, 2001 to Jun. 30, 2002.

* cited by examiner

*Primary Examiner*—Sheela C Chawan
(74) *Attorney, Agent, or Firm*—Klein, O'Neill & Singh, LLP (57) ABSTRACT

Method and system for passively detecting wires from a mobile transport system is provided. The method includes, pre-processing a digital image taken from a digital camera of the transport system, wherein the pre-processing is performed by a pre-processing module to reduce non-wire like clutter from the digital image; identifying pixels that can be classified as wire like by using a segment finder module on the digital image that has been pre-processed by the pre-processing module; and linking the identified pixels to determine if a wire like structure is present, wherein a linker module links the pixels that can be classified as wire like, to generate a wire overlay.

10 Claims, 7 Drawing Sheets

SYSTEM AND METHOD FOR PASSIVE WIRE DETECTION

CROSS REFERENCE TO RELATED APPLICATION

None

BACKGROUND OF THE INVENTION

1. Field of the Invention

The present invention relates to transport systems, and more particularly, to passive wire detection techniques.

2. Background

One of the leading causes of catastrophic in-flight helicopter and tilt-rotor aircraft (or any other transportation system, used interchangeably throughout this specification) accidents is due to contact with static objects, for example, contact with wires ("wire-strike"). Such accidents typically occur when a helicopter collides with power lines, wires or communications lines. Many of these accidents result in fatalities, and they are especially a problem during low altitude helicopter cruising and maneuvering.

Figure 1A:
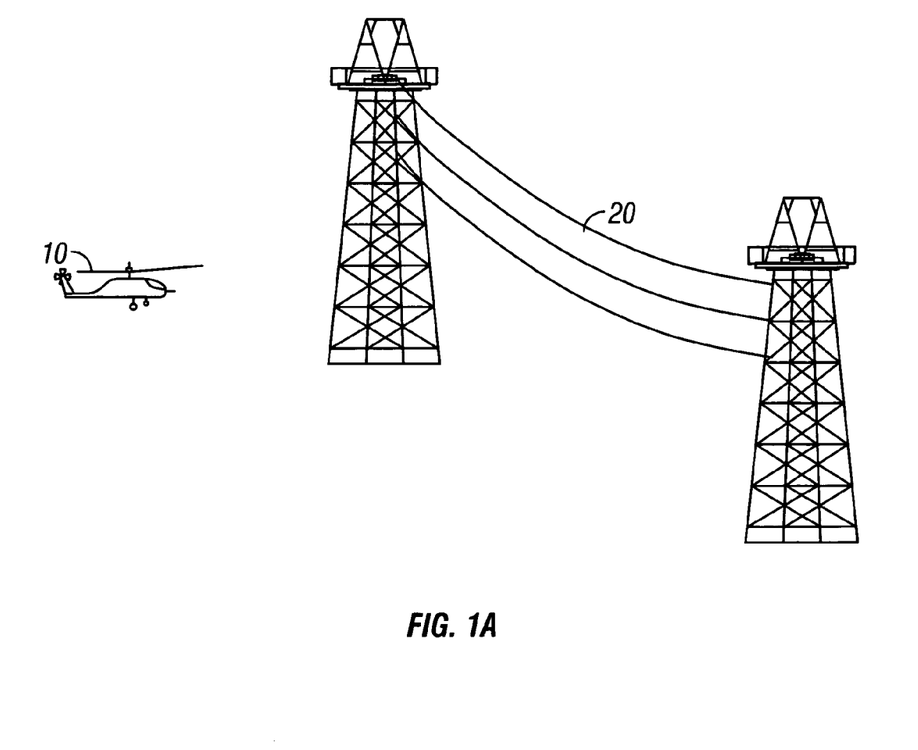
FIG. 1A shows how a helicopter can face wire structures while the helicopter is in flight.

Wires are oftentimes difficult to see by naked eye due to their small size, and this can be exasperated even further by bad weather and visual clutter. FIG. 1A illustrates helicopter 10 flying towards wires 20 (power lines). If the pilot does not detect the power lines on time, then helicopter 10 can crash resulting in fatalities and loss of property.

Active wire sensors in helicopters could be used to mitigate this problem. An active sensor is a detection device that requires input energy from a source other than the target, which is being sensed. An example of an active sensor is a measuring instrument that generates a signal, transmits it to a target, and receives a reflected signal from the target. Information concerning the target is obtained by comparison of the received signal with the transmitted signal. Active sensors cannot be used in cases where stealth/secrecy is required, for example, military operations, and hence this is not a desirable solution for these applications.

Another potential solution is to use passive sensors. Passive sensor devices detect without emitting any energy signals that can cause them to be detected. The detection occurs as a result of radiation from the target or reflection of ambient energy on the target.

However, even with high resolution passive sensors, wires can be very difficult to see at minimum avoidance ranges because they are often sub-pixel, embedded in wire-like clutter, and/or have poor signal-to-noise ratio ("SNR").

Another option is to use real-time image processing to detect the wires. However, conventional real time processing techniques rely on a host of convolution and filtering techniques. Low latency requirements coupled with standard real time processing constraints place severe limits on the size of the convolution kernels and filter sizes. This in turn, degrades wire detection performance and reliability.

Therefore, there is a need for a method and system for parallel real-time passive wire detection techniques, which can efficiently detect wires and notify the pilot of wires to minimize the risk of wire prone accidents.

SUMMARY OF THE PRESENT INVENTION

In one aspect of the present invention, a method for passively detecting wires from a mobile transportation system is provided. The method includes pre-processing a digital image taken from a digital camera of the transport system, wherein the pre-processing is performed by a pre-processing module to reduce non-wire like clutter from the digital image; identifying pixels that can be classified as wire like by using a segment finder module on the digital image that has been pre-processed by the pre-processing module; and linking the identified pixels to determine if a wire like structure is present, wherein a linker module links the pixels that can be classified as wire like, to generate a wire overlay.

In another aspect of the present invention, a system for passively detecting wires from a mobile transportation system is provided. The system includes a pre-processing module for pre-processing a digital image taken from a digital camera of the transport system, wherein the pre-processing module reduces non-wire like clutter from the digital image; a segment finder module for identifying pixels that can be classified as wire like; and a linker module for linking the identified pixels to determine if a wire like structure is present, wherein the linker module links pixels that can be classified as wire like, to generate a wire overlay.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following figures.

DETAILED DESCRIPTION OF THE PREFERRED EMBODIMENTS

To facilitate an understanding of the preferred embodiment, the general architecture and operation of a computing system will be described. The specific architecture and operation of the preferred embodiments will then be described with reference to the general architecture.

Figure 1B:
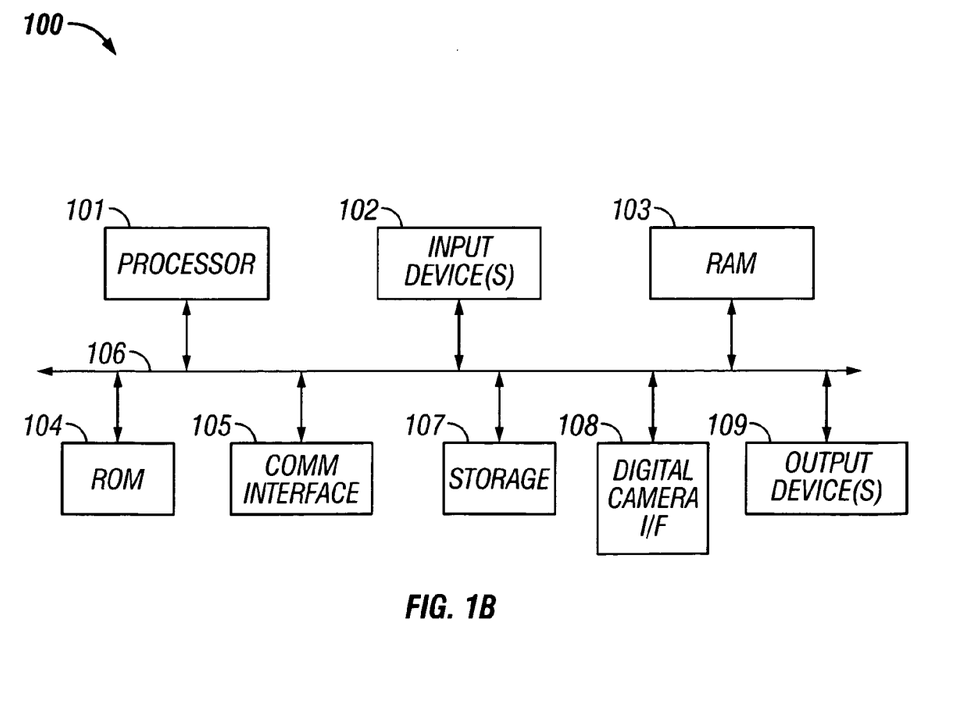
FIG. 1B is a block diagram of a computing system used for passive wire detection, according to one aspect of the present invention.

Computing System:

FIG. 1B is a block diagram showing the internal functional architecture of computing system 100 that is used on a helicopter/aircraft or any other transport system that needs to detect stationery objects to avoid collisions/damage. Computing system 100 includes a processing unit 101 for executing computer-executable process steps and interfaces with a computer bus 106.

A digital camera interface 108 is provided that allows system 100 to receive raw image data from a digital camera 100A (FIG. 1C) or various digital cameras that are placed on a helicopter. Interface 108 receives the image data from the digital cameras and sends the raw data to processor 101.

Component 102 is intended to represent plural input devices, such as a mouse and keyboard that allow a user to interact with system 100. Similarly, output devices 109 represents one or more output devices, for example, a monitor, a printing device, a device that can generate an audible alarm to alert the pilot of the helicopter are included in output devices 109.

Storage device 107 stores applications, executable code according to one aspect of the present. Some of these files are stored using an installation program. For example, processor 101 executes computer-executable process steps of an installation program so that it can properly execute the application program.

Communication interface 105 allows system 100 to interface with other computing systems, networks and communication systems (not shown).

Random access memory ("RAM") 103 also interfaces to computer bus 106 to provide processor 101 with access to memory storage. When executing stored computer-executable process steps from storage device 107, processor 101 stores and executes the process steps out of RAM 103.

Read only memory ("ROM") 104 is provided to store invariant instruction sequences such as start-up instruction sequences or basic input/output operating system (BIOS).

The FIG. 1B architecture is intended to provide an example of an architecture that can be used to implement the executable process steps according to one aspect of the present invention. This architecture should not be viewed as a limitation. Other systems and architectures may be used to implement the executable code, described below. For example, a specialized application specific integrated circuit ("ASIC") or a field programmable gate array ("FPGA") may be used to implement the adaptive aspects of the present invention.

Figure 1C:
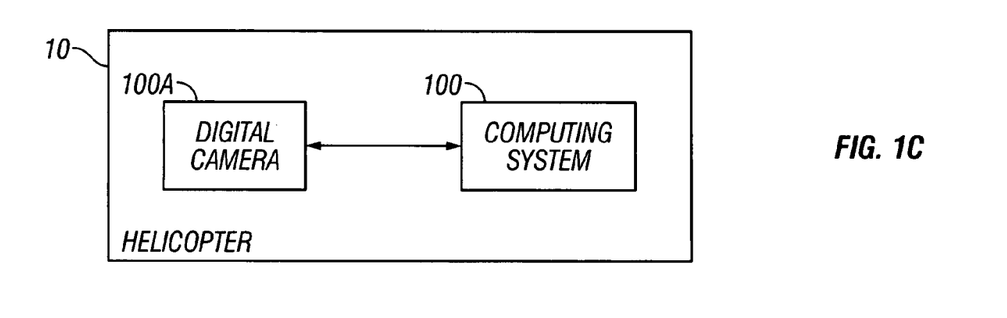
FIG. 1C shows a block diagram of a helicopter using a digital camera, according to one aspect of the present invention.

FIG. 1C shows a digital camera 100A that is placed in a helicopter to take images while the helicopter is flying. The images are sent to computing system 100 for processing and for detecting wires, in real time, as described below in detail. It is noteworthy that although one digital camera is shown in FIG. 1C, it is only intended to illustrate the adaptive aspects of the present invention. The adaptive aspects of the present invention are not limited to any particular number/type of cameras.

Figure 2A:
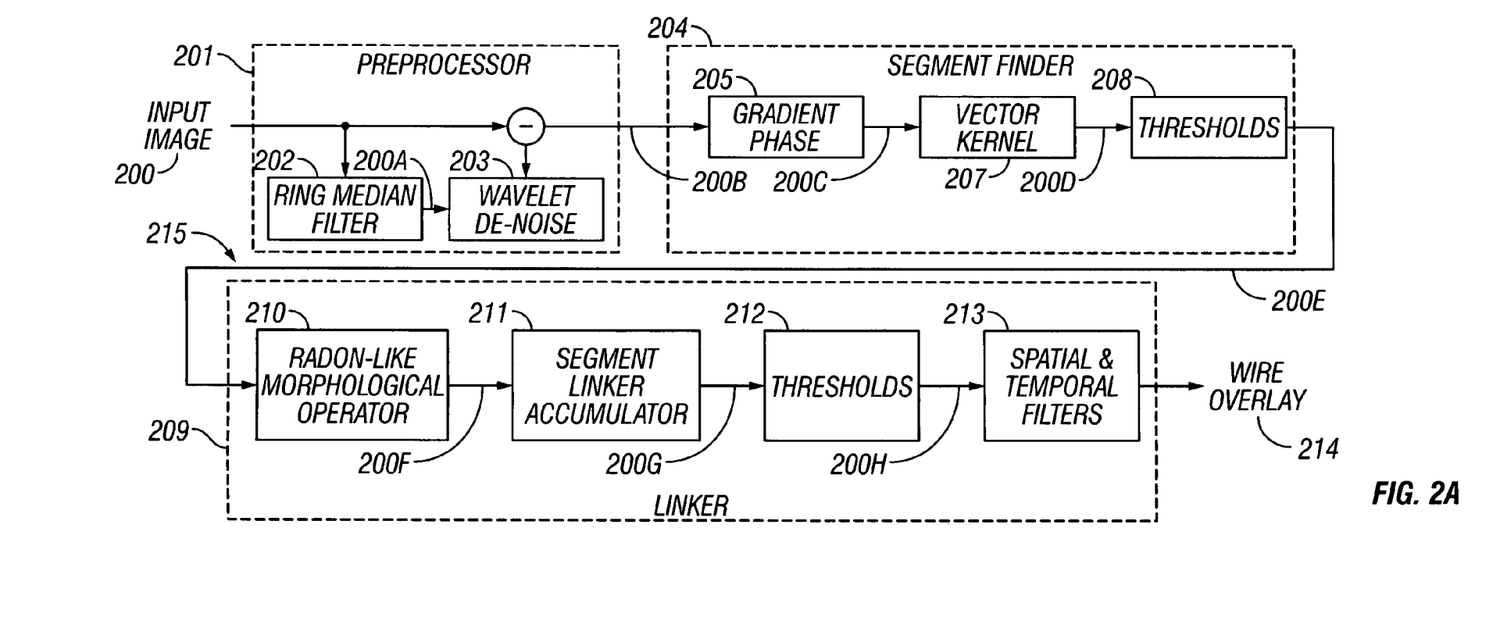
FIG. 2A shows a block diagram of the overall system architecture for passive wire detection, according to one aspect of the present invention.

System Architecture for Passive Wire Detection:

FIG. 2A shows a block diagram of a system according to one aspect of the present invention that passively detects wires. Input image 200 (i.e. raw digital image data) from digital camera (100A) is received by a pre-processor segment 201. The pre-processor segment 201 removes non-wire like clutter from image data 200. Pre-processor 201 includes a ring median filter 202 and a wavelet de-noise module 203 that are used to initially filter the image. Ring median filter 202 and wavelet de-noise module 203 are described below in detail.

Output 200B from pre-processor 201 is sent to a segment finder module 204 that determines the degree to which each pixel's surroundings are wire like. Segment finder 204 includes a gradient phase module 205, a vector kernel 207 and a threshold module 208 that are described below in detail.

A linker module 209 receives output 200E from segment finder 204. The linker module 209 links various segments to build a wire like structure and based on that output 214, a wireless overlay is generated. Linker module 209 includes a radon-like morphological operator 210, a segment linker accumulator 211, threshold module 212 and spatial and temporal filter module 213 that are described below in detail.

Figure 2B:
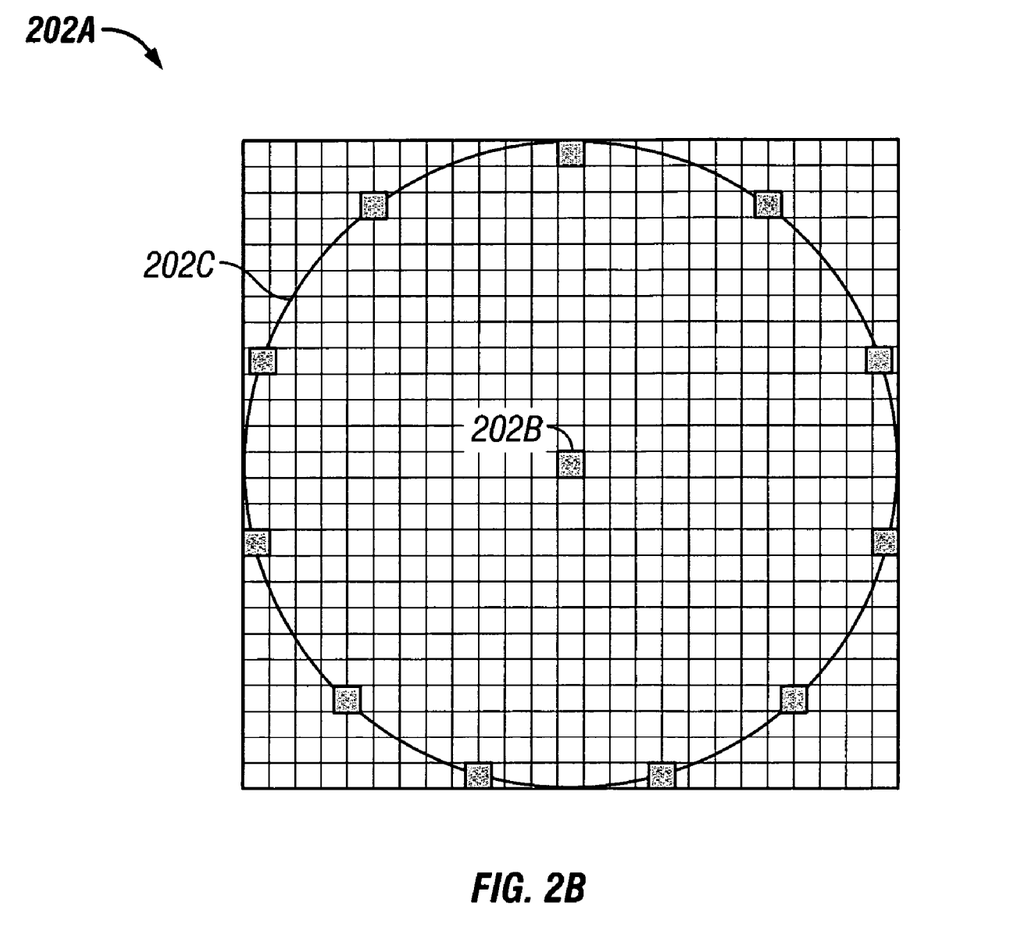
FIG. 2B shows an example of using a ring median filter, according to one aspect of the present invention.

Preprocessor Module 201: The ring median filter 202 eliminates clutter but saves the wires for further analysis. FIG. 2B shows an example of how a ring median filter 202 is applied. The pixel value for a pixel 202B is replaced by the median value of the dark pixels in image area 202A along the ring (shown as 202C). This eliminates objects with a scale size (length or width) less than ½ ring (202C) diameter. Subtracting this median image from the original image would leave objects with a scale size that is less than ½ of the ring diameter.

Figure 2C:
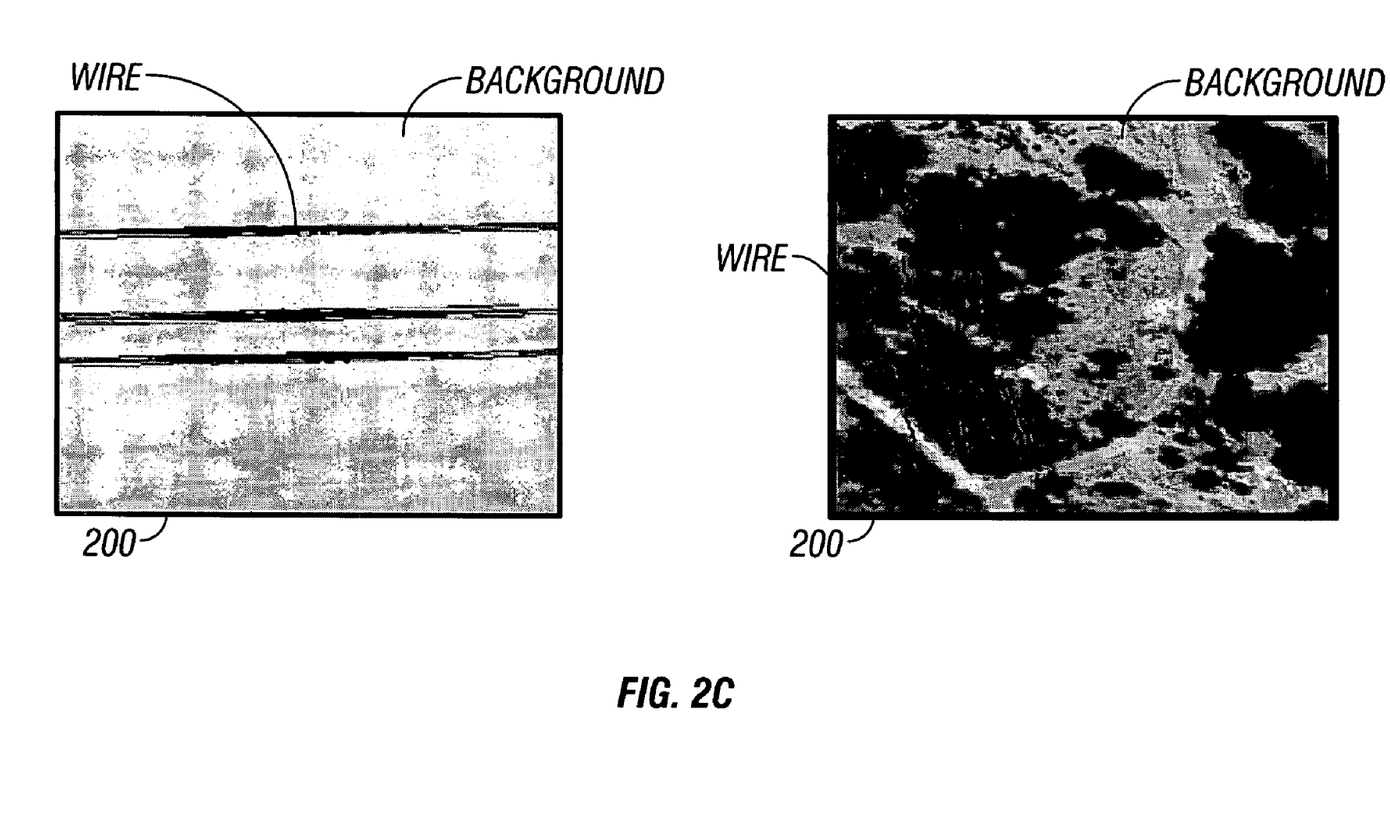
FIG. 2C shows an example of wires with background clutter, according to one aspect of the present invention.

Wires in an image may have low contrast or high contrast compared to the background clutter. The two examples are shown in FIG. 2C with high/low background clutter. Ring median filter 202 is made large enough so that multiple closely spaced wires (as shown in FIG. 2C) are not eliminated. The ring median filtered image 200A is then processed by wavelet de-noise module 203.

Wavelet de-noise module 203 eliminates 2-D wavelet coefficients that are uncorrelated across multiple length scales. Subtracting this filtered image from the original image 200, as shown in FIG. 2A, leaves small-scale features of all contrasts (for example, single wires) and large-scale features with low contrast (for example, multiple wires) intact.

It is noteworthy that instead of using wavelet de-noise module 203, a similar filter (for example, the Susan Filter) may be used to produce output 200B that retains single/multiple wires based on contrast and scale selection.

Figure 3:
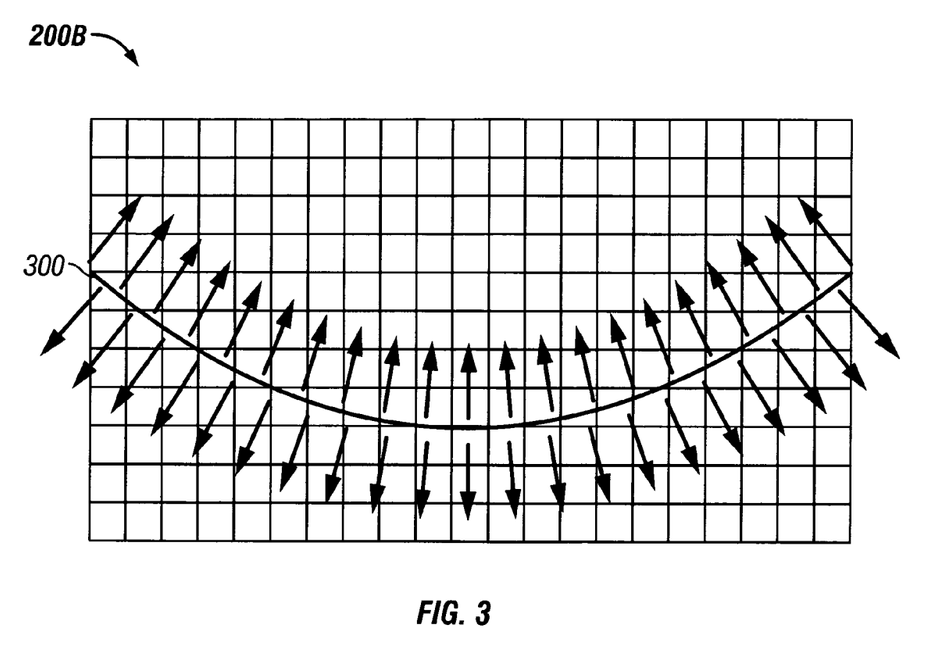
FIG. 3 illustrates an image output after a gradient phase operator is applied.

Segment Finder 204: Segment finder 204 is a prediction tool that identifies potential "wire candidates" based on output 200B. Output 200B is received by a gradient phase module 205. The gradient phase module 205 computes a vector along the local intensity gradient at all pixels in the image scene. For pixels on or very near a wire, this vector will be orthogonal to the wire. Each vector is normalized and, thus, is a unit phasor. This is shown in FIG. 3 with the local intensity gradient of image 200B shown as 300.

Output 200C from the gradient phase module 205 is sent to a vector kernel 207. Vector kernel 207 provides a kernel operator to segregate and identify wire candidates.

Vector kernel 207 provides a kernel that is oriented over each pixel perpendicular to the gradient vector at that pixel. For pixels in the near vicinity of a wire, the kernel will lie along the length of the wire. The normalized two-dimensional vectors, or unit phasors, calculated by the gradient phase module 205 are weighted via the kernel and then summed. The kernel multipliers are positive on one side of the (hypothetical) wire and negative on the other side. If there is a wire, then it will orient the phasors on opposite sides in the same direction and hence the sum will be coherent. The mathematical result is shown as following:

$$\rho_1 e^{i\varphi_1} = \sum_{n=1}^{N} K_n e^{i\theta_n},$$

where $K_n$ is the kernel multiplier for the nth nonzero kernel element (n=1 for the central pixel), and $\theta_n$ is the phase for that element.

For random phase fields, $<\rho_1^2>=N$, and $\phi_1$ is uncorrelated with $\theta_1$.

For perfectly aligned fields, $<\rho_1^2>=0$ (because the positive and negative $K_n$ contributions cancel, and $\phi_1=\theta_1$ (modulo $\pi$).

For a perfectly straight wire, $<\rho_1^2>=N^2$, and $\phi_1=\theta_1$ (modulo $\pi$).

Figure 4:
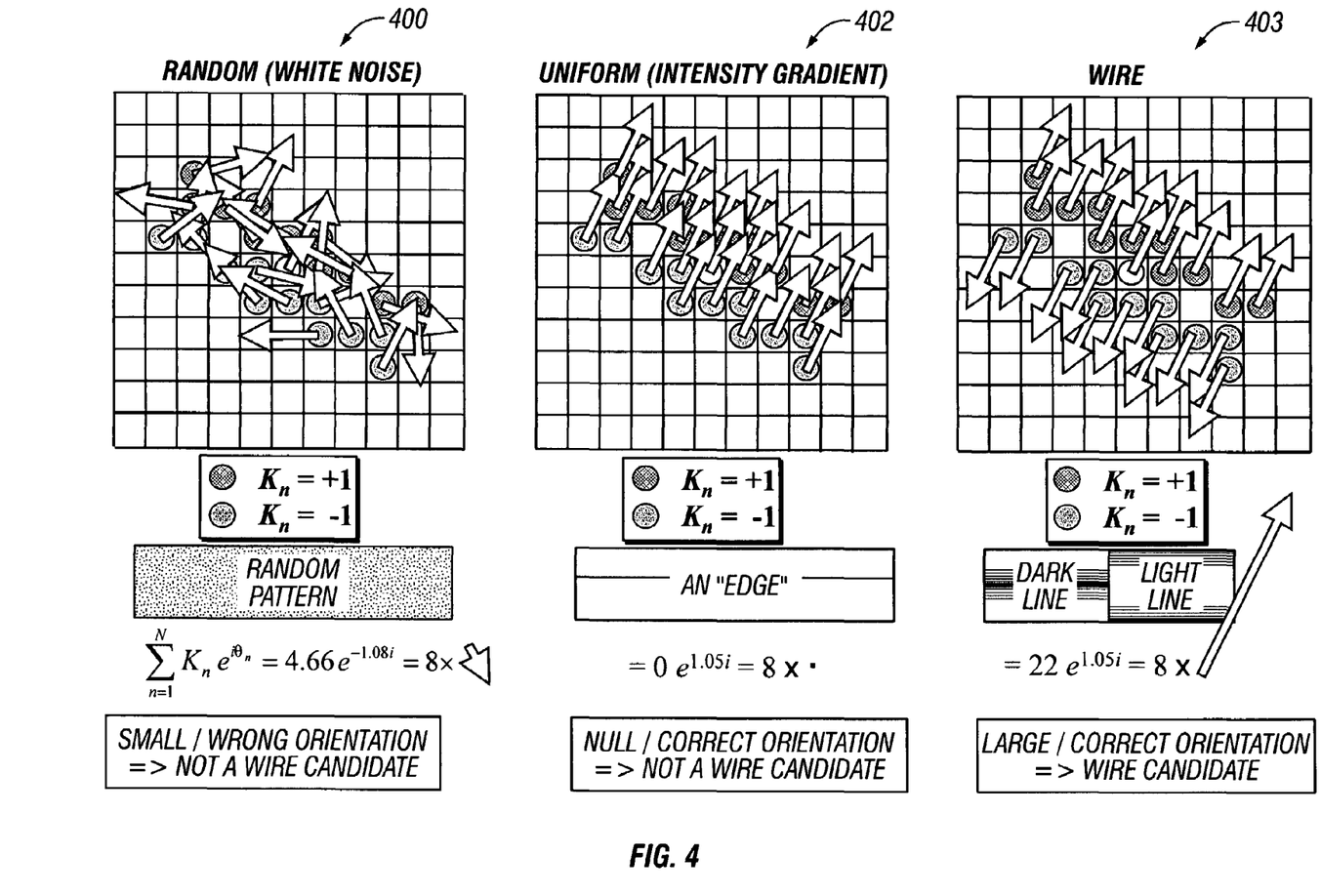
FIG. 4 shows example of image outputs after a vector kernel operator is applied.

FIG. 4 shows image samples after vector kernel 207 is applied to output 200C. Random white noise is shown as 400 and is not a wire candidate. 402 shows a uniform uni-directional intensity gradient, which is an edge and hence is not considered to be a wire candidate. 403 shows an example of a wire candidate where the 2-D vectors are oriented in opposite directions. 403 is considered to be a wire candidate because it is the only case where the vector kernel produces a strong output coherent with the phase of the central pixel.

Output 200D from vector kernel 207 is sent to a threshold module 208. Threshold module 208 assigns a "1" to pixels with vector kernel outputs satisfying plural conditions, for example, if the magnitude exceeds a programmable threshold, and the absolute value of the phase difference (relative to the gradient phase of the central pixel) is below a programmable threshold. A "0" is assigned to all other pixels. Thus, the final output 200E of segment finder module 204 is a binary image.

Linker Module 209:

Output (binary image) 200E from segment finder module 204 is sent to linker module 209. Linker module 209 receives binary image (200E) and uses a radon-like morphological operator 210 to identify "1" pixels from the input image that are strongly aligned into wire like filaments. Operator 210 uses multiple linear morphological operators, and the structure elements of these operators have different orientations. Each of these morphological operators is centered over each of the "1" pixels in the segment finder output, and the number of segment finder "1" pixels within its structure element are summed. If the sum exceeds a programmable threshold, the identification number of that morphological operator is stored in a memory location associated with the central pixel. Thus, the final output 200F of morphological operator 210 is an array of morphological operator identification numbers, indexed by pixel.

Output 200F from operator 210 is sent to a segment linker accumulator (or buffer) 211 that links various pixels into large-scale lines. Module 211 accumulates data in an empty linker accumulation image buffer. This image buffer is at least the same size as the segment finder binary image output 200E, so their pixels are in one-to-one correspondence. For each pixel index in the operator in output 200F, Module 211 centers each of the morphological operators in output 200F associated with this index over a corresponding pixel in the linker accumulation buffer (211). The value "1" is then added to each of the pixels in the linker accumulation buffer 211 that is overlaid by the structure element of the morphological operator. Since the structure elements are linear, accumulation buffer pixels along or in between linear and curvilinear features will have "1" added to them many times. Thus the final output 200G of the segment linker accumulator 211 is an image with large values along linear and curvilinear features, such as wires, but low (or zero) elsewhere.

A threshold module 212 then applies pre-programmed thresholds to Output 200G from module 211. Every pixel in output 200G of the segment linker accumulator 211 with a value above the threshold is set equal to "1." All other pixels are set equal to "0." Thus, the output 200H of threshold module 212 is a binary image similar to that of segment finder module 204, except with non-wire like features removed and with gaps between aligned wire like features (partially) filled in.

Output 200H from threshold module 212 is then filtered by using spatial and temporal filters 213. The spatial filter eliminates features in output 200H of threshold module 212 that do not have length/width ratios consistent with wires, and the temporal filter eliminates pixels that do not satisfy a minimum threshold for frame-to-frame persistence. The filtered output 214 is a binary wire overlay 214.

The wire overlay 214 is used to determine whether wires have been detected, and the pilot is notified if they have. This notification may be performed by overlaying the wire overlay on the video display output, sounding an audible alarm, or any other means that calls the pilot's attention to the wires. This will allow the pilot to change course and avoid potential catastrophic accidents.

Figure 5:
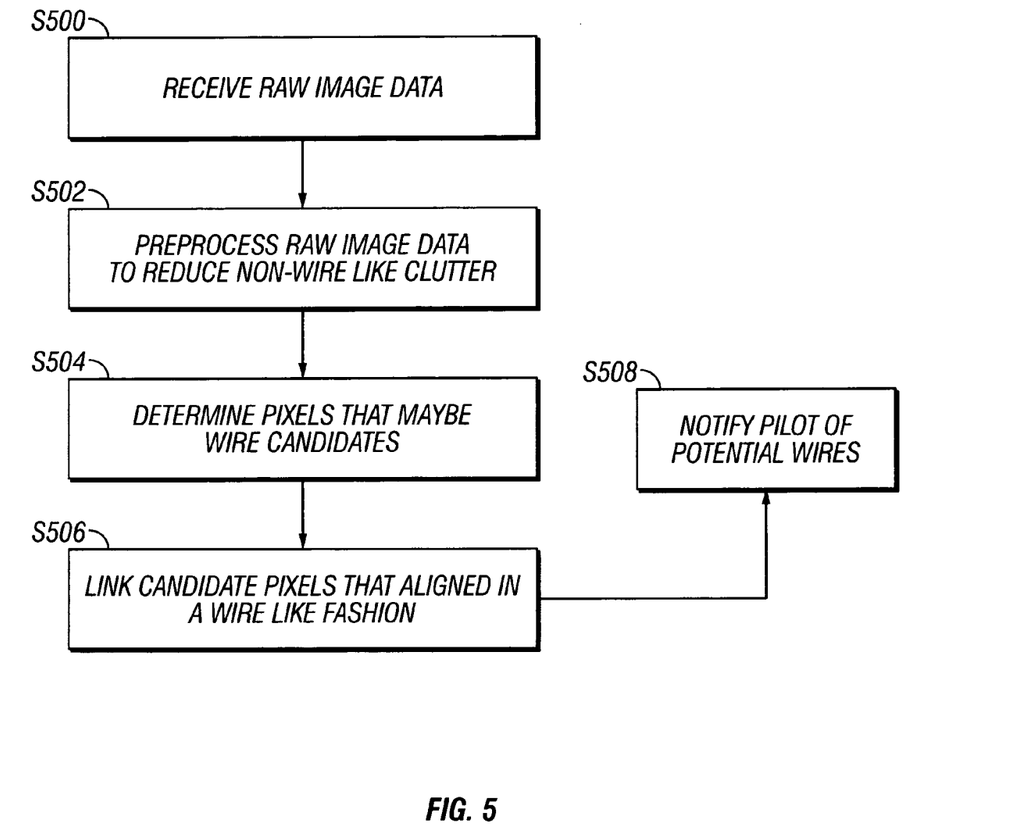
FIG. 5 is a process flow diagram for passive wire detection, according to one aspect of the present invention.

Process Flow Diagram:

FIG. 5 shows a process flow diagram for passively detecting wires from a transport system (for example, a helicopter), according to one aspect of the present invention. This is based on real-time image processing.

Turning in detail to FIG. 5, in step S500, a raw digital image 200 is received from a digital camera(s) that is mounted on a helicopter (as shown in FIG. 1C). The image is received by a processing system, an example of which is shown in FIG. 2A.

In step S502, the raw image is pre-processed so that non-wire like clutter (if present) in the input image 200 is reduced. Pre-processing module 201 is used to reduce the non-wire like clutter. As described above, pre-processing module 201 uses a ring median filter 202 and wavelet de-noise module 203 to reduce the non-wire like clutter.

After the image is pre-processed, in step S504, system 215 using segment finder 204 determines "wire-like" candidates. Segment finder 204 applies a gradient phase module 205 and a vector kernel 207 to determine the wire like candidates. A threshold module 208 is used to filter out non-wire like pixels from the output 200D from vector kernel 207.

In step S506, linker module 209 links the "wire like" pixel candidates to determine if a wire is actually present. Linker 209 uses radon-like morphological operator 210 and segment linker accumulator 211. Threshold module 212 applies programmable thresholds to the output 200G from segment linker accumulator 211 to filter out non wire like pixel structures. Output 200H is then filtered by using spatial and temporal filters 213 to produce a wire overlay 214.

In step S508, if a wire is detected (based on output 214), the pilot is notified. The pilot can then steer the helicopter away from the wires and avoid catastrophic accidents. It is noteworthy that the output 214 may be sent to a central computing system of the helicopter and can be used to automatically steer away the helicopter.

In one aspect, wires can be detected real-time without using active sensors and hence, accidents can be avoided without comprising security.

It is noteworthy that the foregoing illustrations based on a helicopter contacting a stationery wires are not intended to be limiting. The real image processing techniques are intended to be used for any transport system that needs to avoid collision based on any objects that are difficult to detect.

While the present invention is described above with respect to what is currently considered its preferred embodiments, it is to be understood that the invention is not limited to that described above. To the contrary, the invention is intended to cover various modifications and equivalent arrangements within the spirit and scope of the appended claims.

What is claimed is:

1. A method for passively detecting wires from a mobile transportation system, comprising:

pre-processing a digital image taken from a digital camera of the transport system, wherein the pre-processing is performed by a pre-processing module to reduce non-wire clutter from the digital image;

identifying pixels that can be classified as representing one or more wires by using a segment finder module on the digital image that has been pre-processed by the pre-processing module; and linking the identified pixels to determine if a wire is present, wherein a linker module links the pixels that can be classified as representing one or more wires, to generate a wire overlay;

wherein the pre-processing module applies a ring median filter to eliminate clutter and retain portions of the digital image for further processing.

2. The method of claim 1, wherein the pre-processing module includes a wavelet de-noise module that receives an output from the ring median filter and the digital image is then subtracted from the output of the wavelet de-noise module.

3. A method for passively detecting wires from a mobile transportation system, comprising:

pre-processing a digital image taken from a digital camera of the transport system, wherein the pre-processing is performed by a pre-processing module to reduce non-wire clutter from the digital image;

identifying pixels that can be classified as representing one or more wires by using a segment finder module on the digital image that has been pre-processed by the pre-processing module; and linking the identified pixels to determine if a wire is present, wherein a linker module links the pixels that can be classified as representing one or more wires, to generate a wire overlay;

wherein the segment finder module includes a gradient phase module that computes a vector along a local intensity gradient for plural image pixels in the digital image.

4. A method for passively detecting wires from a mobile transportation system, comprising:

pre-processing a digital image taken from a digital camera of the transport system, wherein the pre-processing is performed by a pre-processing module to reduce non-wire clutter from the digital image;

identifying pixels that can be classified as representing one or more wires by using a segment finder module on the digital image that has been pre-processed by the pre-processing module; and linking the identified pixels to determine if a wire is present, wherein a linker module links the pixels that can be classified as representing one or more wires, to generate a wire overlay;

wherein the segment finder module includes a vector kernel operator that uses a kernel oriented over each pixel perpendicular to a phase of a local intensity gradient, so that if there is a wire the kernel is placed along the wire.

5. A method for passively detecting wires from a mobile transportation system, comprising:

pre-processing a digital image taken from a digital camera of the transport system, wherein the pre-processing is performed by a pre-processing module to reduce non-wire clutter from the digital image;

identifying pixels that can be classified as representing one or more wires by using a segment finder module on the digital image that has been pre-processed by the pre-processing module; and linking the identified pixels to determine if a wire is present, wherein a linker module links the pixels that can be classified as representing one or more wires, to generate a wire overlay;

wherein the linker module uses a bank of filters to link pixel segments to create a wire like structure.

6. A system for passively detecting wires from a mobile transportation system, comprising:

a pre-processing module for pre-processing a digital image taken from a digital camera of the transport system, wherein the pre-processing module reduces non-wire clutter from the digital image;

a segment finder module for identifying pixels that can be classified as representing one or more wires; and a linker module for linking the identified pixels to determine if a wire is present, wherein the linker module links pixels that can be classified as representing one or more wires, to generate a wire overlay;

wherein the pre-processing module applies a ring median filter to eliminate clutter and retain portions of the digital image for further processing.

7. The system of claim 6, wherein the pre-processing module includes a wavelet de-noise module that receives an output from the ring median filter and the digital image is then subtracted from the output of the wavelet de-noise module.

8. A system for passively detecting wires from a mobile transportation system, comprising:

a pre-processing module for pre-processing a digital image taken from a digital camera of the transport system, wherein the pre-processing module reduces non-wire clutter from the digital image;

a segment finder module for identifying pixels that can be classified as representing one or more wires; and a linker module for linking the identified pixels to determine if a wire is present, wherein the linker module links pixels that can be classified as representing one or more wires, to generate a wire overlay;

wherein the segment finder module includes a gradient phase module that computes a vector along a local intensity gradient for plural image pixels in the digital image.

9. A system for passively detecting wires from a mobile transportation system, comprising:

a pre-processing module for pre-processing a digital image taken from a digital camera of the transport system, wherein the pre-processing module reduces non-wire clutter from the digital image;

a segment finder module for identifying pixels that can be classified as representing one or more wires; and a linker module for linking the identified pixels to determine if a wire is present, wherein the linker module links pixels that can be classified as representing one or more wires, to generate a wire overlay;

wherein the segment finder module includes a vector kernel operator that uses a kernel oriented over each pixel perpendicular to a phase of a local intensity gradient, so that if there is a wire the kernel is placed along the wire.

10. A system for passively detecting wires from a mobile transportation system, comprising:
- a pre-processing module for pre-processing a digital image taken from a digital camera of the transport system, wherein the pre-processing module reduces non-wire clutter from the digital image;
- a segment finder module for identifying pixels that can be classified as representing one or more wires; and
- a linker module for linking the identified pixels to determine if a wire is present, wherein the linker module links pixels that can be classified as representing one or more wires, to generate a wire overlay;
- wherein the linker module uses a bank of filters to link pixel segments to create a wire like structure.

* * * * *